United States Patent

[11] 3,550,718

[72] Inventors William H. Knuth
Sacramento;
Irving Abel, Arcadia, Calif.
[21] Appl. No. 811,911
[22] Filed Apr. 1, 1969
[45] Patented Dec. 29, 1970
[73] Assignee Aerojet-General Corporation
El Monte, Calif.
a corporation of Ohio

[54] CUSHION CELLS FOR FLUID CUSHION VEHICLES
10 Claims, 3 Drawing Figs.
[52] U.S. Cl. .................................................. 180/121,
180/116, 180/127
[51] Int. Cl. ...................................................... B60v 1/16
[50] Field of Search ........................................... 180/121,
124, 127, 118, 116, 129, 128

[56] References Cited
UNITED STATES PATENTS
3,177,960 4/1965 Cockerell ..................... 180/129
3,319,592 5/1967 Hunt ........................... 180/127UX
3,339,654 9/1967 Bertin et al. .................. 180/127

Primary Examiner—A. Harry Levy
Attorneys—Edward O. Ansell and D. Gordon Angus

ABSTRACT: According to the present disclosure, skirt means is provided and retractable means, mounted to the hull or body of a fluid cushion vehicle, supports the skirt means. The retractable means is adapted to move the skirt between a first position wherein the skirt forms a cushion cell outside of the displacement area of the vehicle and a second position wherein the skirt is retracted. This arrangement permits selective operation of the skirt to selectively increase the effective lifting surface area of the vehicle.

PATENTED DEC 29 1970

3,550,718

INVENTORS,
WILLIAM H. KNUTH
IRVING ABEL
BY
D. Gordon Angus
ATTORNEY

CUSHION CELLS FOR FLUID CUSHION VEHICLES

This invention relates to fluid-cushion vehicles, and particularly to air cushion vehicles having extensible peripheral fluid cushion cells.

Air cushion vehicles ordinarily include a plurality of discrete fluid cushion cells adapted to lift the vehicle above the ground. The force required to lift the vehicle is dependent upon the loaded weight of the vehicle, and is a direct function of the pressure within the fluid cushion cells and the area of the vehicle upon which the pressure reacts. For a given force requirement, the pressure within the cushion cells which is necessary to lift the vehicle may be decreased if the lifting surface area of the vehicle upon which the pressure reacts is increased. Heretofore, the lifting surface area upon which the pressure reacted has been been fixedly determined by the area of the undercarriage of the vehicle and has not been subject to variation.

It is an object of the present invention to provide cushion cells which may be disposed peripherally of the base of a vehicle to increase the effective area upon which the pressure reacts.

Another object of the present invention is to provide peripheral cushions for a fluid cushion vehicle which may be selectively retracted.

Another object of the present invention is to provide means for selectively increasing the effective lifting surface area of a fluid cushion vehicle to improve roll stability of the vehicle.

According to the present invention, fluid cushion cells are disposed peripherally of the base of the fluid cushion vehicle for increasing the effective lifting surface area of the vehicle on which the peripheral cells may react.

According to an optional and desirable feature of the present invention, means is provided for extending and retracting the peripheral cushion cells.

The above and other features of this invention will be more fully understood from the following detailed description, and the accompanying drawings, in which.

Figure 1:
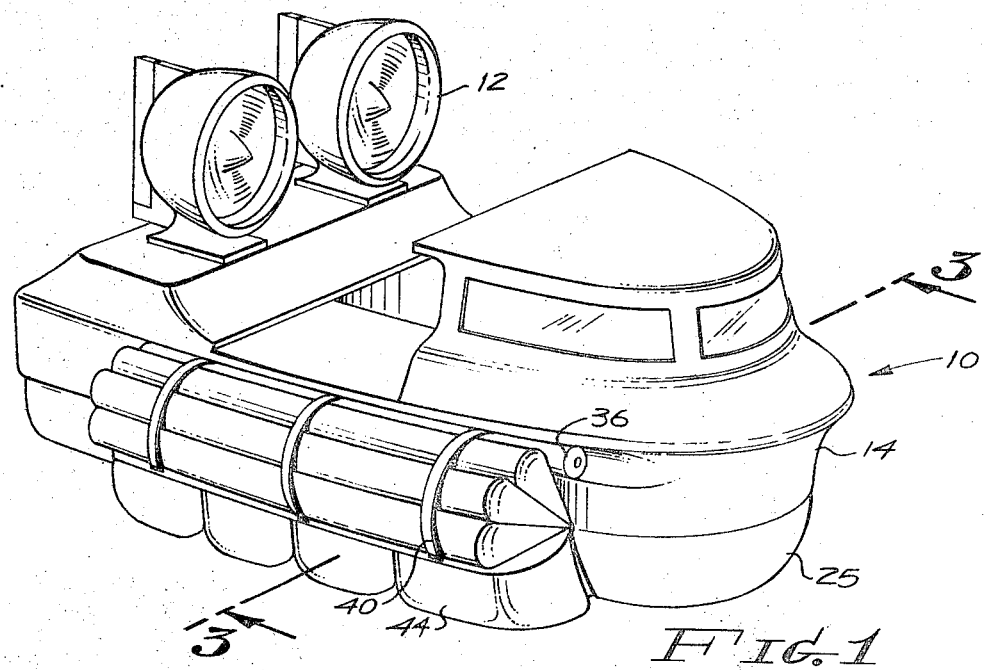
FIG. 1 is a perspective view of a fluid cushion vehicle according to the presently preferred embodiment of the present invention.
Figure 2:
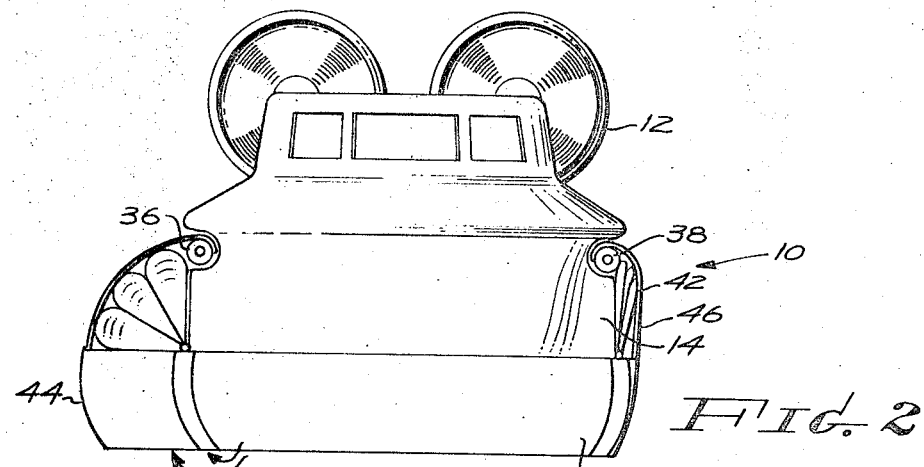
FIG. 2 is a front view of the vehicle illustrated in FIG. 1.

In the drawings there is illustrated a vehicle 10 having a hull 14 and propulsion means, such as propellers 12, supported thereon. Surface 16, which is the lowermost portion of the hull, defines the lifting surface area of the vehicle, and a plurality of cushion cells 18 are mounted to surface 16. Each cushion cell 18 includes a skirt 20 mounted to surface 16 and forming a fluid chamber 22. The lower portion of each chamber has an opening 24. If desired, a peripheral skirt 25 may be supported by the vehicle around skirts 20. Skirts 20 are preferably flexible membranes constructed of suitable materials such as neoprene-coated dacron or neoprene-coated nylon.

Fluid pump 26 is supported by hull 14 and is connected in fluid communication with chambers 22 by means of conduits 28 and 30 and apertures or orifices 32 and 34. Pump 26 is adapted to supply chambers 22 with pressurized fluid, such as air.

Roller mechanism 36 and 38 are mounted to hull 14 of vehicle 10 at one side thereof. Straps 40 and 42 are supported on roller mechanisms 36 and 38, respectively, and are adapted to extend and retract with each revolution of the respective roller mechanism. Preferably, roller mechanisms 36 and 38 are spring-loaded or otherwise biased to retract the straps 40 and 42 about the circumference of each roller.

Fluid cushion skirts 44 and 46, which are preferably constructed of suitable flexible membranes such as neoprene-coated dacron or neoprene-coated nylon, are mounted to the hull 14 of vehicle 10 at the lowermost portion of a peripheral edge thereof. By way of example, skirts 44 and 46 may be connected to hinge members 54 at the junction of opposite sides of hull 14 and surface 16. The free end of each of straps 40 and 42 are attached to an outboard portion of the respective skirts 44 and 46. Selectively inflatable bladders or cushions 48, 50 and 52 are disposed in the region defined by the sides of the vehicle, straps 40 and 42, and the uppermost portion of peripheral skirts 44 and 46, respectively. Although three inflatable bladders are illustrated in the drawings, it is to be understood that any number of such bladders may be used, and that the number will depend upon the particular engineering design.

Preferably, bladder 48 is fixedly attached to the side of hull 14, bladder 50 is fixedly attached to bladder 48 and bladder 52 is fixedly attached to bladder 50. Bladders 48, 50 and 52 are designed so as to converge upon and be attached to hinge 54.

Bladder 48 is in fluid communication with solenoid-operable valve 58 by means of conduit 56, bladder 50 is in fluid communication with solenoid-operable valve 60 by means of flexible conduit 62, and bladder 52 is in fluid communication with solenoid-operable valve 64 by means of flexible conduit 66. The opposite side of each valve 58, 60 and 64 is in fluid communication with the exit side of pump 26 by means of conduit 68. Controller 70 is electrically connected to each of solenoid-operable valve 56, 60 and 64 to selectively operate the valves. By way of example, controller 70 may comprise a plurality of switches (not shown) on the control console of the vehicle for selectively operating the valves. Alternatively, proximity sensors (not shown) may be mounted to the vehicle near the sides thereof and may be connected to controller 70 to automatically retract skirts 44 when the vehicle comes on close proximity to an object. It is to be understood, however, that any number of solenoid valves could be used for operating bladders 48, 50 and 52, and it may be desirable to use a single solenoid valve instead of three as illustrated in the drawings.

Figure 3:
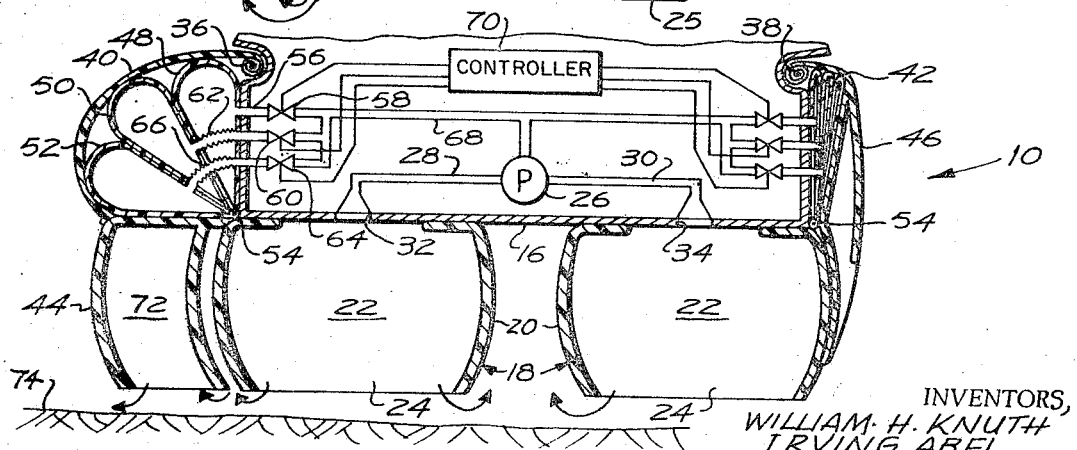
FIG. 3 is a sectional view of the vehicle taken along plane 3—3 in FIG. 1.

In operation, solenoid-operated valves 58, 60 and 64 may be selectively operated to inflate bladders 48, 50 and 52 with air under pressure from pump 26. Inflation of the bladders causes peripheral skirt 44 to assume the position illustrated at the left portion of FIG. 3 to thereby form peripheral cushion chamber 72. Pump 26 operates through conduits 28 and 30 to supply fluid under pressure, such as air, to chambers 22 beneath the hull of the vehicle. The air pressure within chamber 22 reacts against the ground 74 and the lower surface 16 of the base of the vehicle to force the base upwardly. Air escaping through the opening of the chamber 22 escapes into the region between the chambers and into chamber 72, thereby inflating chamber 72. Pressure within chamber 72 reacts against the bladders which in turn react against the hull to aid in the support of the vehicle.

The effective lifting surface area of the vehicle is increased by the peripheral skirts. Since the force for lifting the vehicle is dependent upon the lifting surface area of the vehicle and the pressure within the chambers, the peripheral skirts forming peripheral chamber 72 increase the effective lifting surface area of the vehicle thereby permitting operation of the vehicle with lower pressures within the chambers than hereto fore achieved.

To retract a peripheral cushion cell or chamber, the pressure in the respective bladders is decreased to a lever level below that in the cell. The pressure in the cell forces the cell upwardly, and straps 40 or 42 aid in the retraction of the cell. It is understood that when the cushion cells are extended, the pressure in the bladders exceed the pressure in the cushion cells so that as the pressure in the cushion cells react on the bladders, the pressure in the bladders reacts on the hull of the vehicle.

When the peripheral cushions are extended, the effective lifting area of the base is increased thereby increasing the roll stability of the vehicle. With the cushions retracted, aerodynamic drag at relatively high velocities is reduced. Hence, the selective extension and retraction of the peripheral cushion cells permits selective adjustment of roll stability and aerodynamic drag.

The present invention thus provides effective apparatus for increasing the effective lifting surface area of a fluid cushion vehicle thereby permitting the lower pressures within the fluids chambers and greater roll stability than heretofore realized in prior vehicles. The peripheral skirts are retractable so that the skirts may be retracted to reduce drag and to enable the vehicle to maneuver through relatively narrow passages. The apparatus according to the present invention is effective in operation and easily manufactured and used.

This invention is not to be limited by the embodiment shown in the drawings, and described in the description, which is given by way of example and not of limitation, but only in accordance with the scope of the appended claims.

We claim:

1. A fluid cushion vehicle comprising a substantially rigid hull having an undersurface defining a lifting surface area for said vehicle; first skirt means supported by said hull beneath said undersurface, said first skirt means defining a first cushion cell means adapted to be inflated with pressurized fluid to react against said undersurface to provide a lifting force on said vehicle; second skirt means; and retraction means mounted to said hull and supporting said second skirt means, said retraction means being adapted to move said second skirt means between an extended position wherein said second skirt means forms second cushion cell means adjacent said first cushion cell means and outside of said area and a retracted position wherein said second skirt means is retracted to a side of said hull, whereby when said second skirt means is in its first position, pressurized fluid in said second cushion cell means operates to lift said vehicle thereby increasing the effective lifting surface area of said vehicle.

2. Apparatus according to claim 1 wherein said retraction means includes inflatable bladder means supported by said hull, and inflation means for selectively inflating and deflating said bladder means.

3. Apparatus according to claim 2 wherein said inflation means is adapted to supply said bladder means with fluid having a greater pressure than the pressure of fluid in said second cushion cell means and the pressure in said second cushion cell means reacts against said bladder means.

4. Apparatus according to claim 3 wherein there is a plurality of bladder means and said inflation means comprises a plurality of solenoid-operable valves, said valves being connected to respective ones of said bladder means, and selection means for selectively operating said solenoid-operable valves.

5. Apparatus according to claim 2 wherein there is a plurality of bladder means and said inflation means comprises a plurality of solenoid-operable valves, said valves being connected to respective ones of said bladder means, and selection means for selectively operating said solenoid-operable valves.

6. In a fluid cushion vehicle having a substantially rigid hull having an undersurface defining a lifting surface area for said vehicle and first skirt means supported by said hull beneath said undersurface, said first skirt means defining a first cushion cell means adapted to be inflated with pressurized fluid to react against said undersurface to provide a lifting force on said vehicle, the improvement comprising: second skirt means; and retraction means mounted to said hull and supporting said second skirt means, said retraction means being adapted to move said second skirt means between a first position wherein said second skirt means forms second cushion cell means adjacent said first cushion cell means and outside of said area and a second position wherein said second skirt means is retracted to a side of said hull whereby when said second skirt means is in its first position, pressurized fluid in said second cushion cell means operates to lift said vehicle thereby increasing the effective lifting surface area of said vehicle.

7. Apparatus according to claim 6 wherein said retraction means includes inflatable bladder means supported by said hull, and inflation means for selectively inflating and deflating said bladder means.

8. Apparatus according to claim 7 wherein said inflation means is adapted to supply said bladder means with fluid having a greater pressure than the pressure of fluid in said second cushion cell means and the pressure in said second cushion cell means reacts against said bladder means.

9. Apparatus according to claim 8 wherein there is a plurality of bladder means and said inflation means comprises a plurality of solenoid-operable valves, said valves being connected to respective ones of said bladder means, and selection means for selectively operating said solenoid-operable valves.

10. Apparatus according to claim 7 wherein there is a plurality of bladder means and said inflation means comprises a plurality of solenoid-operable valves, said valves being connected to respective ones of said bladder means, and selection means for selectively operating said solenoid-operable valves.